United States Patent [19]

Shaw et al.

[11] Patent Number: 4,993,828
[45] Date of Patent: Feb. 19, 1991

[54] CAMERA AND METHOD OF PRODUCING AND DISPLAYING A 3-D MOTION PICTURE

[75] Inventors: William C. Shaw, Streetsville; Gordon W. Harris, Oakville, both of Canada

[73] Assignee: IMAX Systems Corporation, Toronto, Canada

[21] Appl. No.: 350,199

[22] Filed: May 11, 1989

[51] Int. Cl.[5] ............................................. G03B 35/00
[52] U.S. Cl. ......................................... 352/59; 352/60; 352/62; 354/210; 354/114
[58] Field of Search ..................... 352/59, 60, 57, 62; 354/210, 112, 113, 114

[56] References Cited

U.S. PATENT DOCUMENTS

| | | | |
|---|---|---|---|
| 1,259,365 | 3/1918 | Cooper | 352/59 |
| 1,593,053 | 7/1926 | Ames | 352/59 |
| 1,860,737 | 5/1932 | Handschiegl | 352/45 |
| 2,337,363 | 12/1943 | Ames, Jr. | |
| 2,517,246 | 8/1950 | Seitz | |
| 2,709,401 | 5/1955 | Jaros | 352/60 |
| 2,916,962 | 12/1959 | Spottiswoode et al. | 354/113 |

FOREIGN PATENT DOCUMENTS 809106 12/1936 France .

OTHER PUBLICATIONS

*Journal of the SMPTE*, "The Stereoscopic Art", Norling, vol. 60, Mar. 1953, pp. 268-308.

"Soviet Inventions Illustrated", week 8830, Jun. 30, 1988, Derwent Publications Ltd., (London, GB), abstract 88-212077/30, & SU, A 1365030 (Bocharov)/Jan. 1988.

"Foundations of the Stereoscopic Cinema; A Study in Depth". Lenny Lipton, Van Nostrand Reinhold Co., 1982: (a) p. 23; (b) pp. 149-153.

*Primary Examiner*—Monroe H. Hayes
*Attorney, Agent, or Firm*—Rogers, Bereskin & Parr

[57] ABSTRACT

A camera for producing 3-D motion pictures has "left eye" and "right eye" camera lenses and two corresponding film transport mechanisms. Images to be recorded on films transported by the mechanisms are reflected by semitransparent mirrors and the mechanisms and the mechanisms are arranged so that the mirrors turn the images transversely of the films. Contact prints made from the films can then simply be turned face-for-face to correct for the image reversals due to the presence of the mirrors. The contact prints are then correctly oriented for projection.

9 Claims, 5 Drawing Sheets

LEFT RIGHT 54 58

54' 58'

90 92

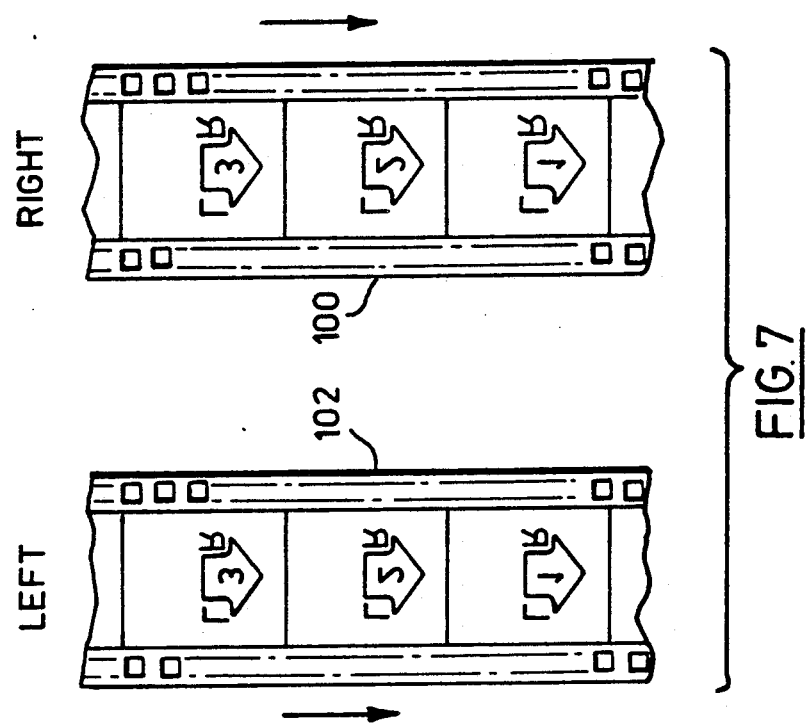

CAMERA AND METHOD OF PRODUCING AND DISPLAYING A 3-D MOTION PICTURE

FIELD OF THE INVENTION

This invention relates generally to stereoscopic or three-dimensional motion pictures (hereinafter called 3-D motion pictures). More particularly, the invention is concerned with a method of producing and displaying a 3-D motion picture, and with a camera for use in the method.

BACKGROUND OF THE INVENTION

Many attempts have been made to produce 3-D motion pictures. The technique generally used involves simultaneously photographing a subject using two motion picture cameras positioned to provide "left eye" and "right eye" views of the subject. The images recorded on films in those cameras are then simultaneously projected onto a screen and are optically coded in some way so that the left eye of a viewer sees only the images that were recorded by the "left eye" camera while the viewer's right eye sees only the "right eye" images. The viewer then perceives a stereoscopic or 3-D effect.

One method of coding the images involves using colour filters (anaglypta). For example, the right eye images may be coloured blue and the left eye images red and the viewer provided with spectacles having filters that are coloured so that the viewer's right eye sees only blue images and the left eye sees only red images. A disadvantage of this technique is of course it can be used only with two monochrome images and produces a monochrome 3-D image. A related technique that can be used with full colour motion pictures involves the use of polarized light. By providing the respective left and right eye projectors with filters that are polarized in directions at 90° to one another and providing the viewer with spectacles having correspondingly polarized lenses, full colour 3-D images can be viewed.

Spectacular 3-D motion pictures can be made by using these known techniques with large format films such as those that are available from Imax Systems Corporation of Toronto, Canada under the registered trade marks IMAX and OMNIMAX. The use of large format films has become possible as a result of development of the so-called "rolling loop" film transport mechanism for cameras and projectors. U.S. Pat. No. 3,494,524 to Jones discloses the principle of a rolling loop transport mechanism. A number of improvements in the original Jones mechanism are disclosed in U.S. Pat. Nos. 3,600,073, 4,365,877 and 4,441,796 (all to Shaw).

A practical difficulty of making 3-D motion picture films is that presently available cameras cannot be positioned sufficiently close to one another that the axes of the camera lenses are at the required interocular distance of two to three inches (i.e. a typical eye spacing) that is necessary to obtain a proper 3-D effect. Attempts to achieve interocular spacing by interposing prisms, mirrors or other optical devices between the cameras and the subject to be photographed result in image reversals that must be compensated for example by special optical printing steps or by mirrors in the projector optics.

Examples of prior art publications in this area are:
British Patent No. 740,927 (Spottiswoode et al.)
Letter from Polaroid Corporation, dated Aug. 9, 1956 signed by Donald L. Brown (copy in U.S. Pat. Classification No. 352-59)
"3-D IMAX Camera Assembly", Perforations, Vol. 4, No. 4, 1984.
"3-D IMAX Progress Report", Perforations, Vol. 4, No. 4, 1984.
"Future Cinema", Perforations, Vol. 4, No. 3, 1984.
"Large Screen 3-D—Aesthetic and Technical Considerations", Perforations, Vol. 3, No. 4, July 1983.

An object of the present invention is to provide an improved method of producing and displaying 3-D motion pictures which permits interocular spacing to be achieved when the motion picture is being made, while avoiding the need for special optical printing steps or modification of projector optics. A further object is to provide a camera for use in the method.

SUMMARY OF THE INVENTION

Broadly speaking, the invention resides in an arrangement of mirrors, lenses and film travel that have all been chosen purposely to act in co-operation to allow the significant benefit of being able to produce economical contact prints for a 3-D motion picture that can be projected without the need for costly optical printing techniques, or complicated mirror arrangements. A subject is recorded on film as a series of images that have been turned laterally of the film as a result of being reflected in a mirror. A contact print made from that film can then be simply "flipped" prior to projection, so that images on the print are brought into correct orientation for projection.

More specifically, the invention provides a camera which includes "left eye" and "right eye" lenses spaced apart an appropriate distance (e.g. an interocular distance) and defining respective generally parallel optical axes. A mirror is associated with each lens and is positioned at a substantially 45° angle with respect to the optical axis of the said lens for reflecting an image received by the lens through substantially 90°. The two mirrors are positioned at substantially 90° to one another so that images passing through the respective lenses are reflected in opposite directions to respective film exposure apertures. Means is provided for transporting "left eye" and "right eye" films respectively past the apertures for exposure of the films. Films are disposed at the apertures in respective film planes that are approximately parallel to one another and the films are transported past the apertures with the films oriented so that, when the camera is positioned with the lenses in a common horizontal plane, an erect subject is recorded on each film as a series of images that have been turned laterally of the film as a result of the being reflected in the relevant said mirror. The camera also includes shutter means for controlling exposure of each film to a said subject.

The invention is particularly useful where the camera is of a type in which an erect subject is recorded as images extending transversely of the film (as in IMAX format cameras). In this case, the use of mirrors is required in order to permit the camera lenses to be located at the required interocular spacing. In accordance with the invention the images are not only inverted and turned laterally (as is used with a photographic objective), but are also re-erected by being reflected in the mirrors. This permits the images to be oriented correctly for projection by simply "flipping" contact prints made from films in the camera as described in more detail below.

The invention also provides a method of producing and displaying a 3-D motion picture in which respective "left eye" and "right eye" films are simultaneously exposed to a subject using the camera of the invention to produce, on the respective films, a series of "left eye" and "right eye" images of said subject that have been turned laterally of each film as a result of being reflected in a mirror. The films are developed to produce respective master film negatives and respective contact prints are made directly or indirectly from the negatives. For projection, the prints of both master film negatives are turned face-for-face about a longitudinal axis of the print so that images on the print are turned laterally of the print as compared with the images as recorded during photography. This "corrects" for the image reversal that took place as a result of reflection of the images when the master film negatives were made. Respective left eye and right eye images are projected from the two prints to provide co-incident 3-D images on a screen. The images are optically coded and the viewer is provided with optical decoding means for ensuring that left eye images are presented to the viewer's left eye only and that right eye images are presented to the viewer's right eye only.

It will be appreciated that, by arranging for the images of the subject to be recorded on each film as a series of images that have been turned laterally of the film as a result of being reflected in a mirror, it is possible to correct for this image reversal at the time the films are projected by the simple expedient of turning face-for-face about a longitudinal axis both of the films (or contact prints made therefrom). The need for special optical printing steps, mirrors in the projector optics, or other complications are avoided.

Coding of the images for projection may be effected by any of the various known techniques such as those discussed above. Polarization techniques of course offer the advantage that they permit the use of full colour films. Another known technique that may be used involves the use of what are in effect shutters on spectacles worn by a viewer that open and close in timed relation to projection of images onto the screen so that the viewer's right eye is obstructed by the shutters when left eye images appear and the viewer's left eye is obstructed when "right eye" images appear. This is known as "alternate eye" 3-D.

BRIEF DESCRIPTION OF THE DRAWINGS

In order that the invention may be more clearly understood, reference will now be made to the accompanying drawings which illustrate a number of preferred embodiments of the invention by way of example, and in which: FIGS. 1, 2 and 3 are schematic illustrations of a camera of the form provided by the invention, in which FIG. 1 is a plan view with the housing partly broken away, FIG. 2 is a rear elevational view with the camera housing in section and FIG. 3 is a vertical sectional view;

DESCRIPTION OF THE PREFERRED EMBODIMENTS

Figure 1:
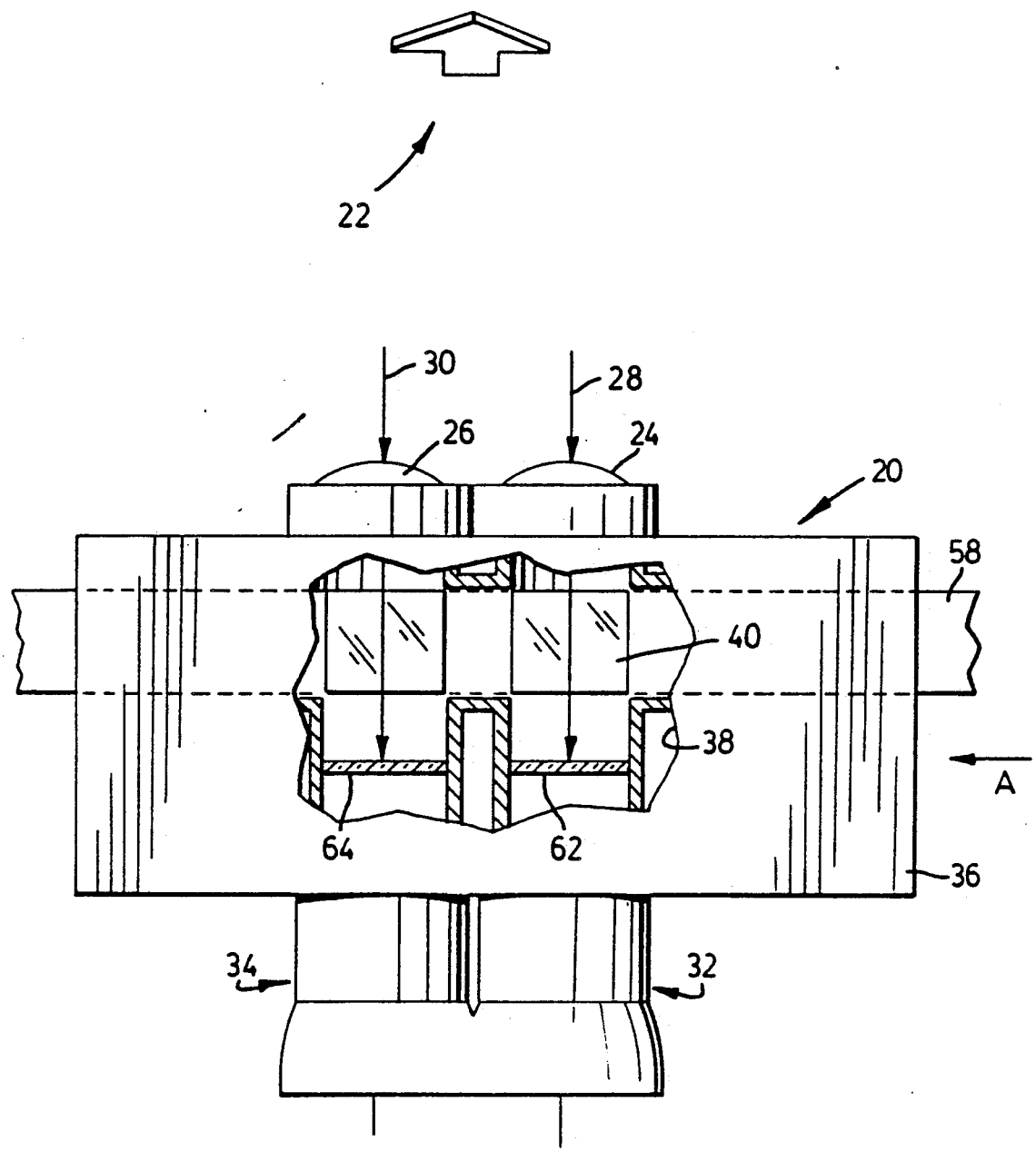
Figure 3:
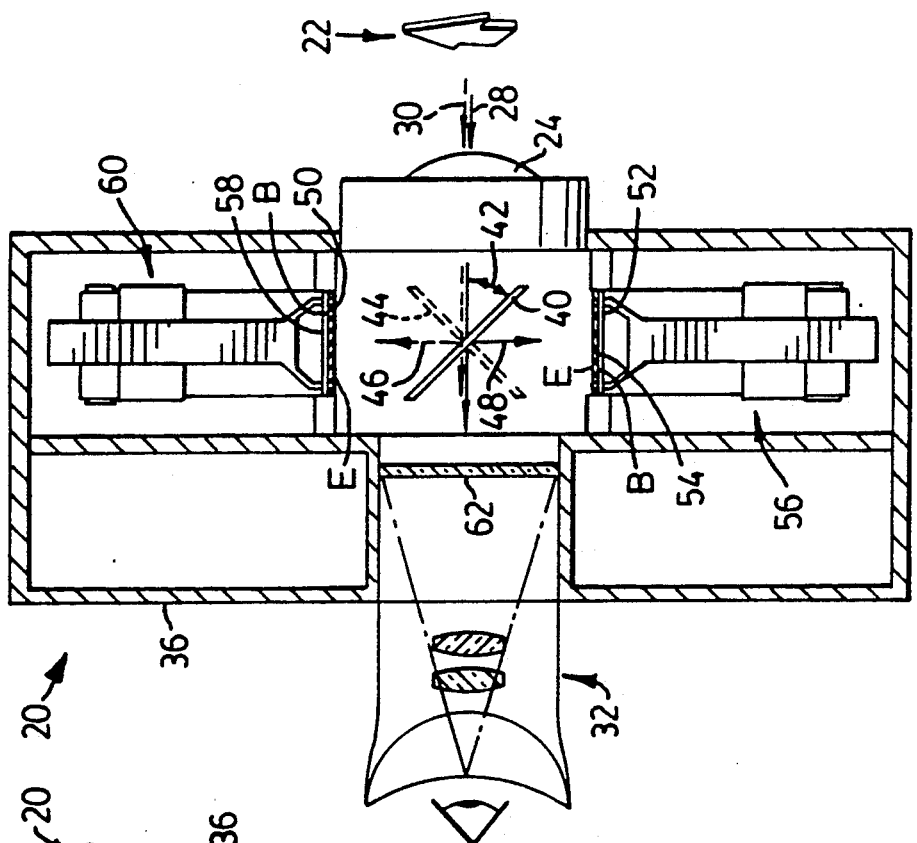
Figure 2:
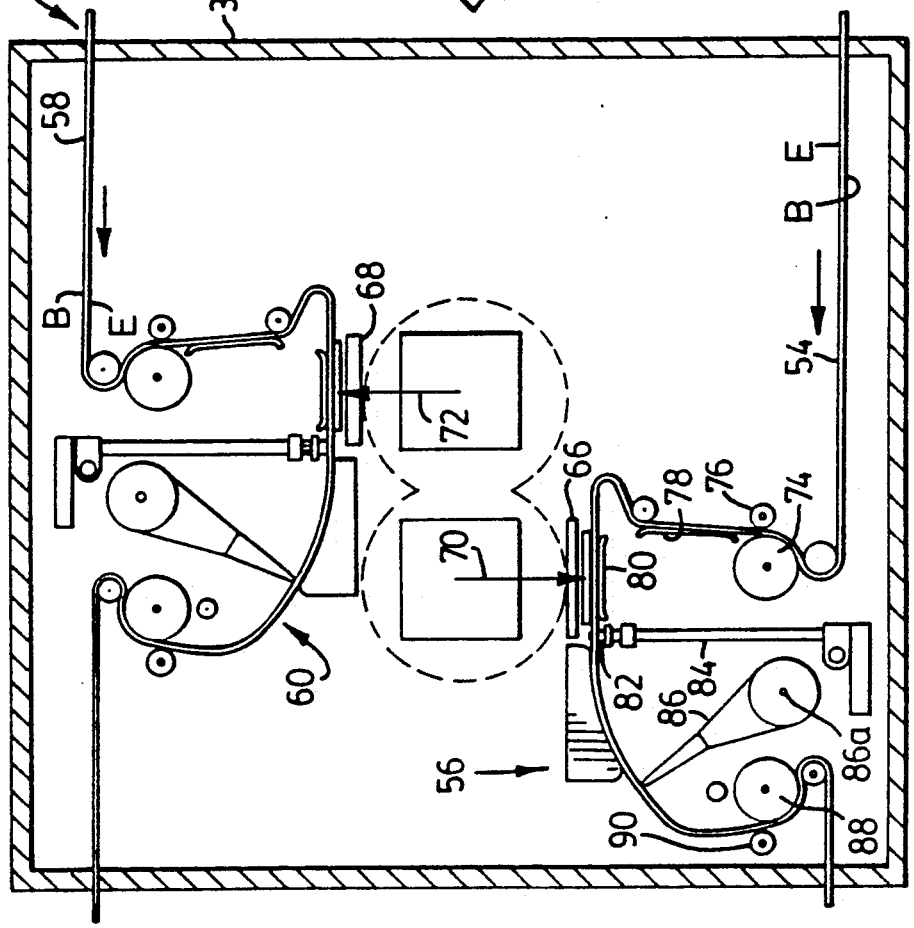

Reference will first be made to FIGS. 1 to 3 in describing a camera of the form provided by the invention. In those views, the camera is generally designated by reference numeral 20 and a subject, the image of which is to be recorded in 3-D format is shown at 22 as an erect three dimensional arrow. For the sake of simplicity, the drawings show only the principal components of the camera, in schematic form.

Referring first to FIG. 1, the camera is shown to include a "right eye" lens 24 and a "left eye" lens 26. The lenses are spaced apart an appropriate interocular distance and define respective optical axes 28 and 30. Corresponding eye pieces for viewing through the lenses are shown at 32 and 34 respectively. The camera housing is indicated at 36 and is partly broken away at 38 to show internal components which will be described later.

FIG. 3 may be considered as a side elevational view in the direction of arrow A in FIG. 1 and with the camera housing 36 shown in section. A semi-transparent mirror is associated with each of the lenses 24, 26 and each mirror is positioned at a 45° angle with respect to the optical axis of the associated lens for reflecting an image received by the lens through 90°. In FIG. 3, the mirror for lens 24 is shown in full lines at 40 positioned at a 45° angle denoted 42 to the optical axis 28 of the lens. The corresponding mirror for lens 26 is shown in dotted outline at 44. The two mirrors 40, 44 are positioned at 90° to one another so that images passing through the respective lenses are reflected in opposite directions as shown by the arrows 46 and 48 representing respectively images reflected from mirror 40 and images reflected from mirror 44. The mirrors reflect the images to respective film exposure apertures 50 and 52.

The camera includes two film transport mechanisms for respective "left eye" and "right eye" films. In FIG. 3, part of the left eye film is visible in aperture 52 at 54 and the associated film transport mechanism is generally denoted 56. The corresponding right eye film is indicated at 58 and the mechanism at 60.

Light that is not reflected by the mirrors 40 and 44 passes directly to the eyepieces 32 and 34 so that the camera operator can directly view the subject being photographed. The lenses 24 and 26 have not been illustrated in detail and their focusing mechanisms have not been shown since they form no part of the present invention and may be conventional. However, for reference purposes, focusing screens in the respective eyepieces 32, 34 have been shown at 62 and 64 (best seen in FIG. 1).

FIG. 2 illustrates the two film transport mechanisms 56 and 60 and shows the paths of the two films through the camera housing. Magazines for the films have not been shown and shutters associated with respective film transport mechanisms have been indicated only diagrammatically at 66 and 68 respectively. Also, since the two film transport mechanisms are essentially identical, mechanism 56 only will be described, as representative of the two mechanisms.

The two films 54 (the left eye film) and 58 (the right eye film) travel horizontally through the camera housing in the same direction. The emulsion (sensitive) side of the film is denoted by the letter E in each case while the base side is denoted B. As indicated by the arrows 70 and 72, exposure of the respective films takes place at the apertures 52 and 50 (as shown in FIG. 3). At the apertures, the films lie in parallel planes and travel in the same direction.

Referring specifically to the left eye film 54, the film is directed towards aperture 52 by an input sprocket 74 under an input keeper roller 76. A film guide plate 78 controls the film downstream of the input sprocket and a vacuum plate 80 holds the film flat for exposure at aperture 52. Retractable registration pins 82 carried by an arm 84 hold the film precisely in register at the aperture. A film advance claw 86 moves in an arcuate path about an axis 86a to advance the film in steps. After being released by the claw, an output sprocket 88 and output keeper roller 90 direct the film out of the camera housing.

Figure 4A:
FIG. 4 comprises a series of sequenctional views denoted (a) to (f) that illustrate the steps of the method of the invention.
Figure 4A:
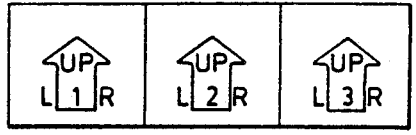
Figure 4B:
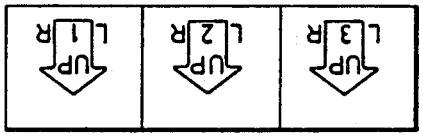
Figure 4B:
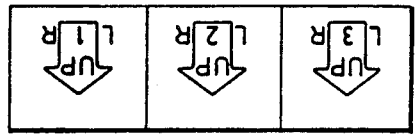

FIG. 4(a) shows two series of images of the actual object 22 as they would be seen by a viewer if looking directly at the object (not through the camera). FIG. 4(b) shows a corresponding series of images as they would appear on the focusing screens 62 and 64. It will be seen that the images have been inverted and reversed side-to-side by the camera lenses. The eyepiece optics will of course "correct" the images as seen by the camera operator, as is conventional.

Figure 4C:
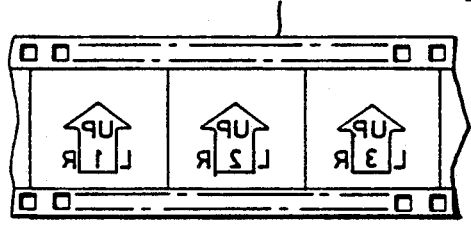
Figure 4C:
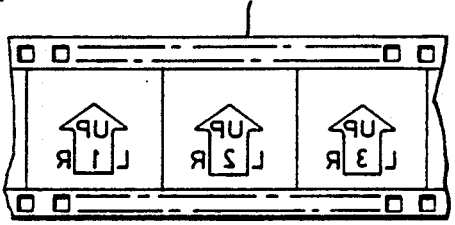

FIG. 4(c) shows the corresponding images as they would appear looking through the two films 54 and 58 from the base sides of both films. It will be seen that the images have been turned laterally of the film (inverted) as a result of being reflected in the mirrors 40 and 44, and are mirror images.

Figure 4D:
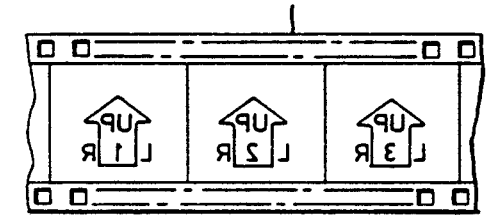
Figure 4D:
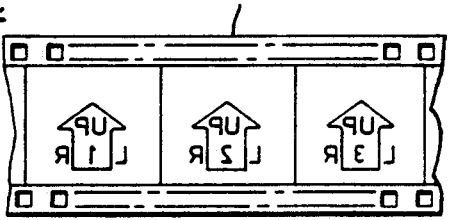

FIG. 4(d) shows prints made by contact printing from master film negatives made by developing the films 54 and 58. Printing is performed emulsion side to emulsion side and the prints are shown as viewed from the emulsion side. The prints are of course identical with the negatives. While the prints may be made directly from the master film negatives, the prints may also be made via "interpositive" and "internegative" prints, as is well known in the art.

Figure 4E:
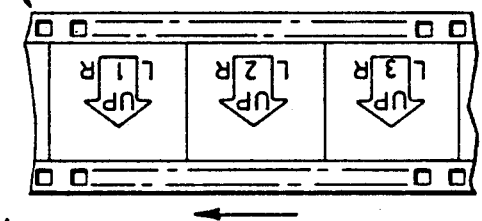
Figure 4E:
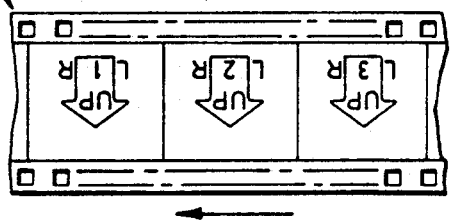
Figure 4F:
Figure 4F:

In order to correct for the image reversal that took place due to the presence of the mirrors 40 and 44 in the camera, for projection the contact prints are "flipped" or turned face-for-face about their longitudinal axes as indicated by the arrows 90 and 92. The prints are then correctly oriented for projection as shown in FIG. 4(e). The prints are run with the emulsion sides towards the projection lens (away from the lamp, unlike usual projection practice) so that "corrected" images are projected onto the screen as shown in FIG. 4(f). In FIG. 4(e) the prints are shown from the base side as they would appear in the projector, looking towards the screen.

Figure 5:
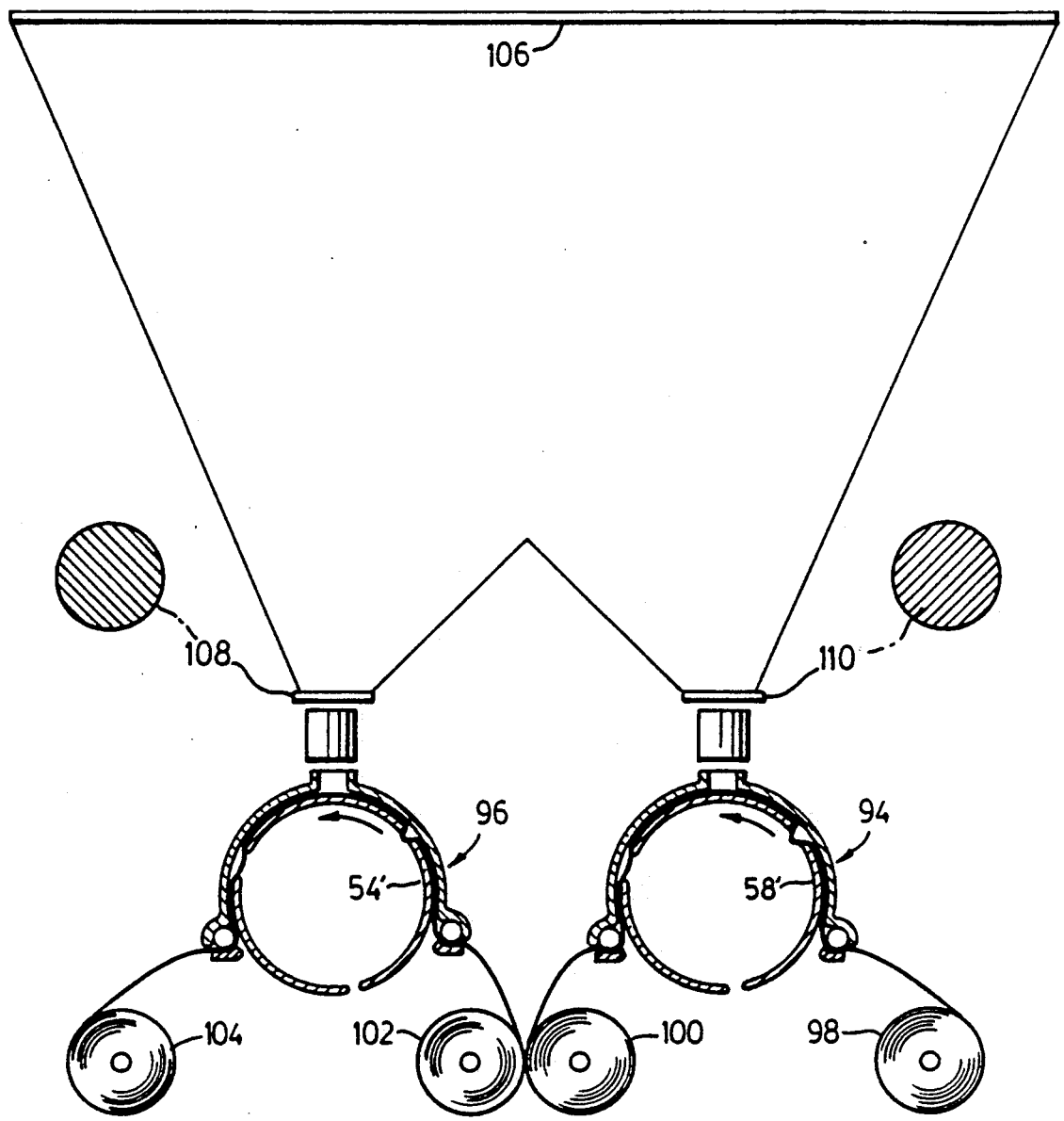
FIG. 5 is a diagrammatic plan view of a projector installation for projecting images from the prints shown in FIG. 4(e)

FIG. 5 is a plan view of a projector installation for use in showing the contact prints, which are denoted respectively 54' and 58'. The installation includes respective right and left projectors 94 and 96, each having associated film platters 98, 100 and 102, 104 respectively. Print 58' travels from platter 98 to platter 100 while print 54' travels from platter 102 to platter 104. The two projectors are arranged to project co-incident 3-D images from the two prints onto a screen denoted 106.

In this particular embodiment, the two projectors are shown schematically as IMAX projectors of the general form described in U.S. Pat. No. 3,600,073. This patent discloses specific details of the projector. For present purposes, it is sufficient to note that successive rolling loops of the film are conveyed around inside a circular stator by a rotating rotor so that the film generally follows an arcuate-shaped path as shown in FIG. 5.

As noted previously, for projection, the two contact prints 54' and 58' are loaded into the projectors oriented as shown in FIG. 4(e) with the emulsion side of the film (the side opposite that seen in FIG. 4(e)) towards the projection lenses. During projection, the images will be inverted and reversed by the projection lenses and appear correctly on screen 106.

Figure 6:
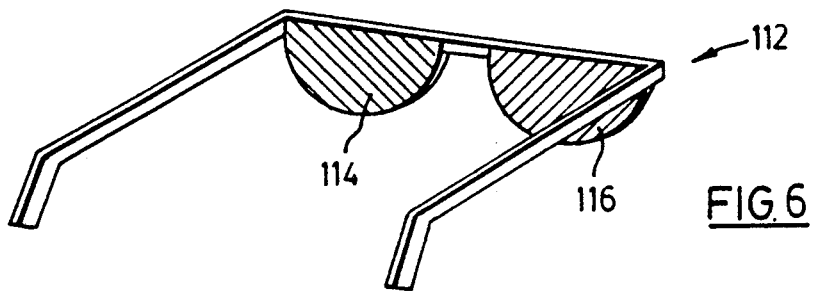
FIG. 6 is an illustration of a pair of polarized spectacles that may be used in viewing the projected images; and, FIG. 7 is a view similar to FIG. 4(c) showing film negatives produced using a different form of camera.

Coding of the left and right eye images as discussed previously is effected in this embodiment by the use of polarizing filters indicated at 108 and 110 in FIG. 6. In this embodiment, the filters are arranged to polarize the light from the projectors in directions that are 45° to the right and left of vertical respectively as shown by the circle areas indicated by chain-dotted lead lines.

FIG. 6 shows a pair of spectacles 112 that will be worn by people viewing the film. The spectacles have respective left and right eye lenses 114 and 116 in the form of polarizing filters. The left eye lens 114 is polarized in the same direction as filter 108 so that it will not admit polarized light from the right eye projector 94, while lens 116 is polarized in the same direction as filter 110 so that it will not admit the polarized light from the left eye projector 96. The viewer will then see true stereoscopic or 3-D images on the screen 106.

FIG. 7 illustrates the fact that the method of the invention may be practised using film transport mechanisms arranged so that an erect subject is recorded as a series of images that extend longitudinally of the film instead of transversely as in the previous embodiment. This image orientation would be achieved, for example, if the film transport mechanisms move the films vertically downwards as seen in FIGS. 1 to 3, (instead of horizontally) and mirrors 40 and 44 are correspondingly re-oriented. FIG. 7 shows the images that would be produced on such films. It will be seen that the images have been inverted and reversed right to left as a result of passing through the camera lenses and have been turned transversely of the film as a result of being reflected in the mirrors within the camera. As in the previous embodiment, the images can be "corrected" by turning the films face-for-face about their longitudinal axes, for projection, without the need for optical printing to correct their orientation. The projectors themselves will of course have to be conventional projectors in which the films travel vertically during projection.

Even though existing cameras that use the film format shown in FIG. 7 can sometimes be positioned at the interocular spacing required to produce 3-D effects without the need for internal mirrors, a camera of the form provided by the invention may offer advantages in terms of ease of film loading/unloading and flexibility of camera design in that increased space may be made available to accommodate the film transport mechanisms of the camera.

It will of course be appreciated that the preceding description relates to particular preferred embodiments of the invention and that many modifications are possible within the broad scope of the invention. Some modifications have been indicated previously and others will be apparent to a person skilled in the art. For example, as noted, even though IMAX cameras and projectors have been referred to specifically, they are not essential to the invention.

Within the broad scope of the invention, it would be possible to practice the method of the invention using camera means other than the particular dual film camera provided by the invention. As indicated previously, the master film negatives could be produced using two separate cameras and associated mirrors.

It should also be noted that, while FIGS. 1 to 3 show an embodiment in which the mirrors reflect the images of the subject vertically, the mirrors could be oriented to reflect the images horizontally and the film transport mechanisms positioned at opposite sides of the camera. In the case of IMAX film format, the film would be transported horizontally parallel to the lens axes while with conventional film format, the film would move vertically downwards as discussed previously in connection with FIG. 7.

It should finally be noted that, while the drawings show specifically two separate rolling loop projectors, a single projector capable of simultaneously projecting images from two films may be used.

WE CLAIM:

1. A camera for use in producing 3-D motion pictures, comprising:
   respective left eye and right eye lenses spaced apart and defining respective substantially parallel optical axes;
   in association with each said lens, a mirror positioned at a substantially 45° angle with respect to the optical axis of the lens, for reflecting an image received by the lens through substantially 90°, the two mirrors being positioned at substantially 90° with respect to one another so that images passing through the respective lenses are reflected in opposite directions to respective film exposure apertures;
   means for transporting "left eye" and "right eye" films respectively past said apertures for exposure of the films, the films being disposed at said apertures in respective film planes that are substantially parallel to one another and the films being transported past said apertures with the films oriented so that, when the camera is positioned with said lenses in the same horizontal plane, an erect subject is recorded on each film as a series of images that have been turned laterally of the film as a result of being reflected in the relevant said mirror; and,
   shutter means for controlling exposure of said films to a subject.

2. A camera as claimed in claim 1, wherein each of said film transport means is arranged so that an erect subject is recorded on a film transported past the relevant film exposure aperture as a series of images each extending transversely of the film, when the camera is positioned with said lenses in the same horizontal plane, said images being inverted and turned laterally by said lenses and being re-erected by reflection in said mirrors.

3. A camera as claimed in claim 2, wherein said mirrors are oriented to reflect images passing through the respective lenses in vertical directions considering the camera positioned with the lenses in the same horizontal plane, and wherein said film transport means comprises respective first and second film transport mechanisms disposed above and below said mirrors respectively and arranged so that the respective films travel in parallel horizontal film planes at the positions of said film exposure apertures.

4. A camera as claimed in claim 1, wherein said mirrors are semi-transparent, and wherein the camera further comprises respective left and right eyepieces aligned with the respective lenses for receiving images passing through said mirrors.

5. A method of producing and displaying a 3-D motion picture, comprising the steps of:
   (a) providing a camera comprising:
       respective "left eye" and "right eye" lenses spaced apart and defining respective substantially parallel optical axes;
       in association with each said lens, a mirror positioned at a substantially 45° angle with respect to the optical axis of the lens, for reflecting an image received by the lens through substantially 90°, the two mirrors being positioned at substantially 90° with respect to one another so that images passing through the respective lenses are reflected in opposite directions to respective film exposure apertures;
       means for transporting "left eye" and "right eye" films respectively past said apertures for exposure of the films, the films being disposed at said apertures in respective film planes that are substantially parallel to one another and the films being transported past said apertures with the films oriented so that, when the camera is positioned with said lenses in the same horizontal plane, an erect subject is recorded on each film as a series of images that have been turned laterally of the film as a result of being reflected in the relevant said mirror and,
       shutter means for controlling exposure of said films to a subject;
   (b) simultaneously exposing to a subject respective "left eye" and "right eye" films using said camera to produce on the respective films, a series of steroscopic "left eye" and "right eye" images of said subject that have been turned laterally of each film as a result of being reflected in said mirrors;
   (c) developing said films to produce respective master film negatives;
   (d) making contact prints derived from said master film negatives;
   (e) turning each of said prints face-for-face about a longitudinal axis of the print, so that images on said print are turned laterally of the print as compared with the images as recorded during photography, to bring the images on the print into proper orientation for projection;
   (f) projecting left and right eye images from the respective prints to provide co-incident 3-D images on a screen; and,
   (g) optically coding the left and right eye images and providing a view with optical decoding means for ensuring that left eye images are presented to the viewer's left eye only and that right eye images are presented to the viewer's right eye only.

6. A method as claimed in claim 5, wherein said film transport means are of a type in which an erect subject is recorded on each of said left eye and right eye films as a series of images extending transversely of the film when the camera is positioned with said lenses in the same horizontal plane, said images being inverted and turned laterally by said lenses and being re-erected by reflection in said mirrors.

7. A method as claimed in claim 6, wherein said mirrors are oriented to reflect images passing through the respective lenses in vertical directions considering the camera positioned with the lenses in the same horizontal plane, and wherein said film transport means comprises respective first and second film transport mechanisms disposed above and below said mirrors respectively and arranged so that the respective films travel in parallel horizontal film planes at the positions of said aperture.

8. A method as claimed in claim 5, wherein said step of projecting respective left and right eye images is performed using rolling loop film projectors.

9. A method as claimed in claim 5, wherein said step of optically coding the left and right eye images is effected by providing the respective projectors with polarizing filters that are polarized in directions at right angles to one another, and wherein the optical decoding means comprises spectacles for each viewer in which the left and right eye lenses comprise filters polarized to correspond with the polarizing filters of the projectors.

* * * * *